(12) United States Patent
Hayashi et al.

(10) Patent No.: US 8,369,011 B2
(45) Date of Patent: Feb. 5, 2013

(54) OBSERVATION OPTICAL SYSTEM AND MICROSCOPE INCLUDING THE OBSERVATION OPTICAL SYSTEM

(75) Inventors: Kazuhiro Hayashi, Tokyo (JP); Kenji Kawasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 290 days.

(21) Appl. No.: 12/828,572

(22) Filed: Jul. 1, 2010

(65) Prior Publication Data

US 2011/0007389 A1  Jan. 13, 2011

(30) Foreign Application Priority Data

Jul. 8, 2009 (JP) ................................. 2009-161788

(51) Int. Cl.
*G02B 21/00* (2006.01)

(52) U.S. Cl. ........................................ 359/379

(58) Field of Classification Search .............. 359/379, 359/382, 383
See application file for complete search history.

(56) References Cited

U.S. PATENT DOCUMENTS

| | | | | |
|---|---|---|---|---|
| 4,209,225 A | * | 6/1980 | Abe et al. | 359/379 |
| 4,744,642 A | * | 5/1988 | Yoshinaga et al. | 359/379 |
| 4,834,516 A | * | 5/1989 | Kajitani et al. | 359/363 |
| 5,519,531 A | * | 5/1996 | Sato | 359/380 |
| 5,710,662 A | * | 1/1998 | Nishida | 359/368 |
| 5,729,385 A | * | 3/1998 | Nishida et al. | 359/434 |
| 6,072,622 A | * | 6/2000 | Biber | 359/368 |
| 6,188,515 B1 | * | 2/2001 | Nihoshi | 359/384 |
| 6,407,857 B2 | | 6/2002 | Kawasaki | |
| 6,649,893 B2 | * | 11/2003 | Fujimoto et al. | 250/201.2 |
| 6,850,362 B2 | * | 2/2005 | Brooker | 359/379 |
| 7,265,899 B2 | * | 9/2007 | Morita | 359/384 |
| 7,522,336 B2 | * | 4/2009 | Hermann et al. | 359/379 |
| 7,550,699 B1 | * | 6/2009 | Marshall | 250/201.4 |
| 2001/0030801 A1 | | 10/2001 | Kawasaki | |
| 2004/0141231 A1 | | 7/2004 | Hund et al. | |
| 2004/0190128 A1 | * | 9/2004 | Hund et al. | 359/368 |
| 2004/0240048 A1 | | 12/2004 | Dietrich et al. | |
| 2008/0225388 A1 | * | 9/2008 | Hirata | 359/385 |

FOREIGN PATENT DOCUMENTS

| | | | |
|---|---|---|---|
| JP | 02123310 A | * | 5/1990 |
| JP | 11-072708 A | | 3/1999 |
| JP | 2001-264636 A | | 9/2001 |
| JP | 2004-245860 A | | 9/2004 |
| JP | 2004-530948 A | | 10/2004 |
| JP | 2006-292831 A | | 10/2006 |
| JP | 4035509 B2 | | 11/2007 |
| WO | WO 03/003099 A2 | | 1/2003 |
| WO | WO 03/003099 A3 | | 1/2003 |

* cited by examiner

*Primary Examiner* — Mark Consilvio
(74) *Attorney, Agent, or Firm* — Holtz, Holtz, Goodman & Chick, PC

(57) ABSTRACT

An observation optical system includes, in order from a sample side, an infinity-corrected objective, a first lens group having a positive power, a second lens group having a positive power, and a tube lens having a positive power. An intermediate image is formed between the first lens group and the second lens group, and at a front side focal position of the second lens group. A space along an optical axis between the objective and the first lens group is configured to be changeable, and a space along an optical axis between the second lens group and the tube lens is configured to be changeable.

25 Claims, 12 Drawing Sheets

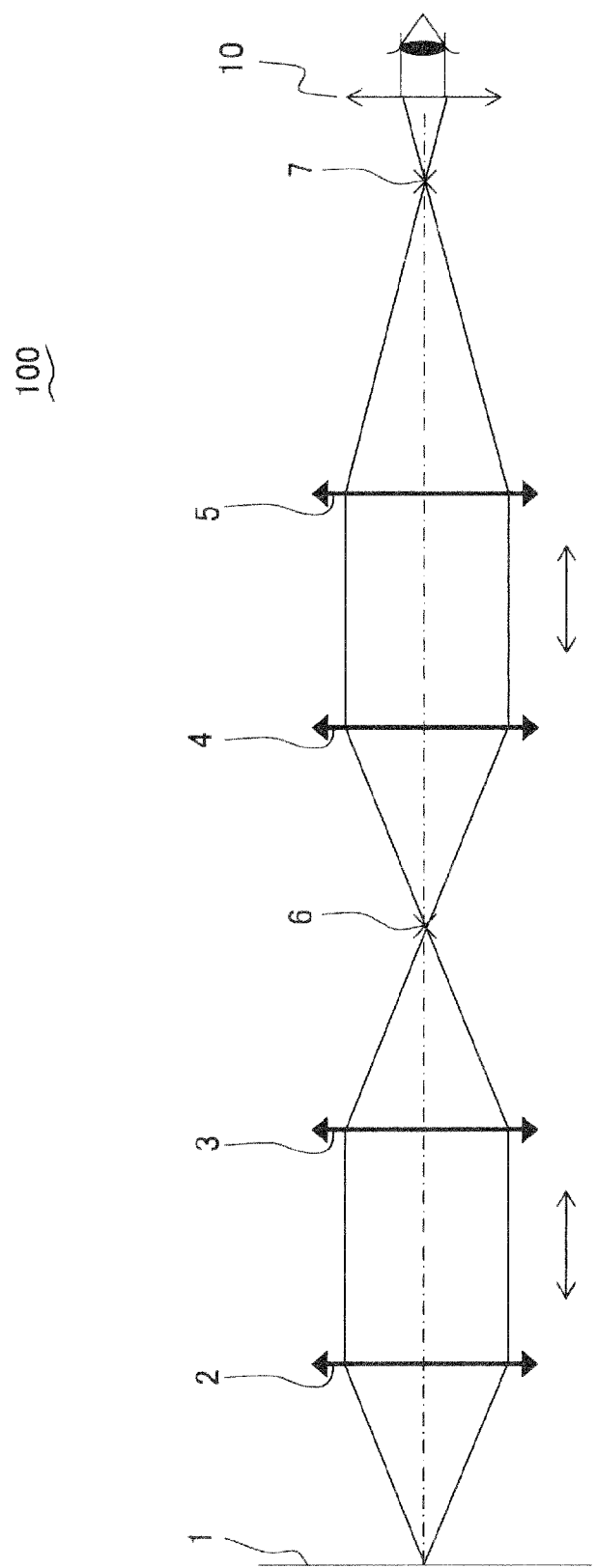
F I G. 1

_US 8,369,011 B2_

OBSERVATION OPTICAL SYSTEM AND MICROSCOPE INCLUDING THE OBSERVATION OPTICAL SYSTEM

CROSS REFERENCE TO RELATED APPLICATIONS

This application is based upon and claims the benefit of priority from the prior Japanese Patent. Application No. 2009-161788, filed Jul. 8, 2009, the entire contents of which are incorporated herein by this reference.

BACKGROUND OF THE INVENTION

1. Field of the Invention

The present invention relates to an observation optical system, and a microscope using the observation optical system, and more particularly, to an observation optical system including afocal parts having a large amount of extension, and to a microscope using the observation optical system.

2. Description of the Related Art

In recent years, microscopes have been used in various fields, and observation operations using a microscope have been performed for a long time in many cases. Accordingly, to enable an observation causing no burden to an observer's posture, a function of adjusting a position of an eyepiece lens (hereinafter referred to as an eye point position) that an observer looks through in accordance with his or her body is demanded for microscopes.

Examples of various microscope configurations that can adjust an eye point position that have been proposed to meet such demands include Japanese National Publication of International Patent Application (Kohyo) No. 2004-530948, Japanese Laid-open Patent Publication No. 2006-292831, Japanese Patent Publication No. 4035509, and Japanese Laid-open Patent. Publication No, 2001-264636. These patent documents propose configurations for implementing an eye point position that is optimal for an observer by adjusting any one or a combination of <a> an eye point position in a vertical dimension (for example, a distance of a microscope from the surface of a desk to an eyepiece lens of the microscope in the vertical dimension), <b> an eye point position in a horizontal dimension (for example, a distance in the horizontal dimension from a focusing handle to an eye point position), and <c> an angle of an optical axis at an eye point position (namely, an angle at which an observer looks through an eyepiece lens; referred to hereinafter as an angle of depression).

Specifically, Japanese National Publication of International Patent Application (Kohyo) No. 2004-530948 discloses a configuration for adjusting <a> an eye point position in a vertical dimension. Japanese Laid-open Patent Publication No. 2006-292831 discloses a configuration for adjusting <a> an eye point position in a vertical dimension, and <c> an angle of depression. Japanese Patent Publication No. 4035509 discloses a configuration for adjusting <b> an eye point position in a horizontal dimension, and <c> an angle of depression. Japanese Laid-open Patent Publication No. 2001-264636 discloses a configuration for adjusting <b> an eye point position in a horizontal dimension, <c> an angle of depression, and an eye point position coaxial to the angle of depression. With the adjustment of an eye point position coaxial to an angle of depression, <a> an eye point position in a vertical dimension and <b> an eye point position in a horizontal dimension can be simultaneously adjusted at a certain ratio according to the angle of depression.

With the above described adjustments of <a> and <b> but not <c> the adjustment of an angle of depression for rotating an optical axis with a rotation mechanism, an optical path length is changed. Normally, with the adjustments of <a> and <b>, the entire optical path length is changed by extending/contracting an focal part passed through by an afocal right flux that does not affect an image forming position. With the extension/contraction of the afocal part, an eye point position is adjusted.

SUMMARY OF THE INVENTION

One embodiment of the present invention provides an observation optical system that comprises, in order from a sample side, an infinity-corrected objective, a first lens group having a positive power, a second lens group having a positive power, and a tube lens having a positive power. In the observation optical system, an intermediate image is formed between the first lens group and the second lens group, and at a front side focal position of the second lens group, a space along an optical axis between the objective and the first lens group is configured to be changeable, and a space along an optical axis between the second lens group and the tube lens is configured to be changeable.

Another embodiment of the present invention provides a microscope that comprises an observation optical system including, in order from a sample side, an infinity-corrected objective, a first lens group having a positive power, a second lens group having a positive power, and a tube lens having a positive power. In the microscope, an intermediate image is formed between the first lens group and the second lens group, and at a front side focal position of the second lens group, a space along an optical axis between the objective and the first lens group is configured to be changeable, and a space along an optical axis between the second lens group and the tube lens is configured to be changeable.

BRIEF DESCRIPTION OF THE DRAWINGS

The present invention will be more apparent from the following detailed description when the accompanying drawings are referenced.

FIG. 1 is a schematic diagram illustrating an optical configuration of an observation optical system according to an embodiment of the present invention;

DESCRIPTION OF THE PREFERRED EMBODIMENTS

Figure 2:
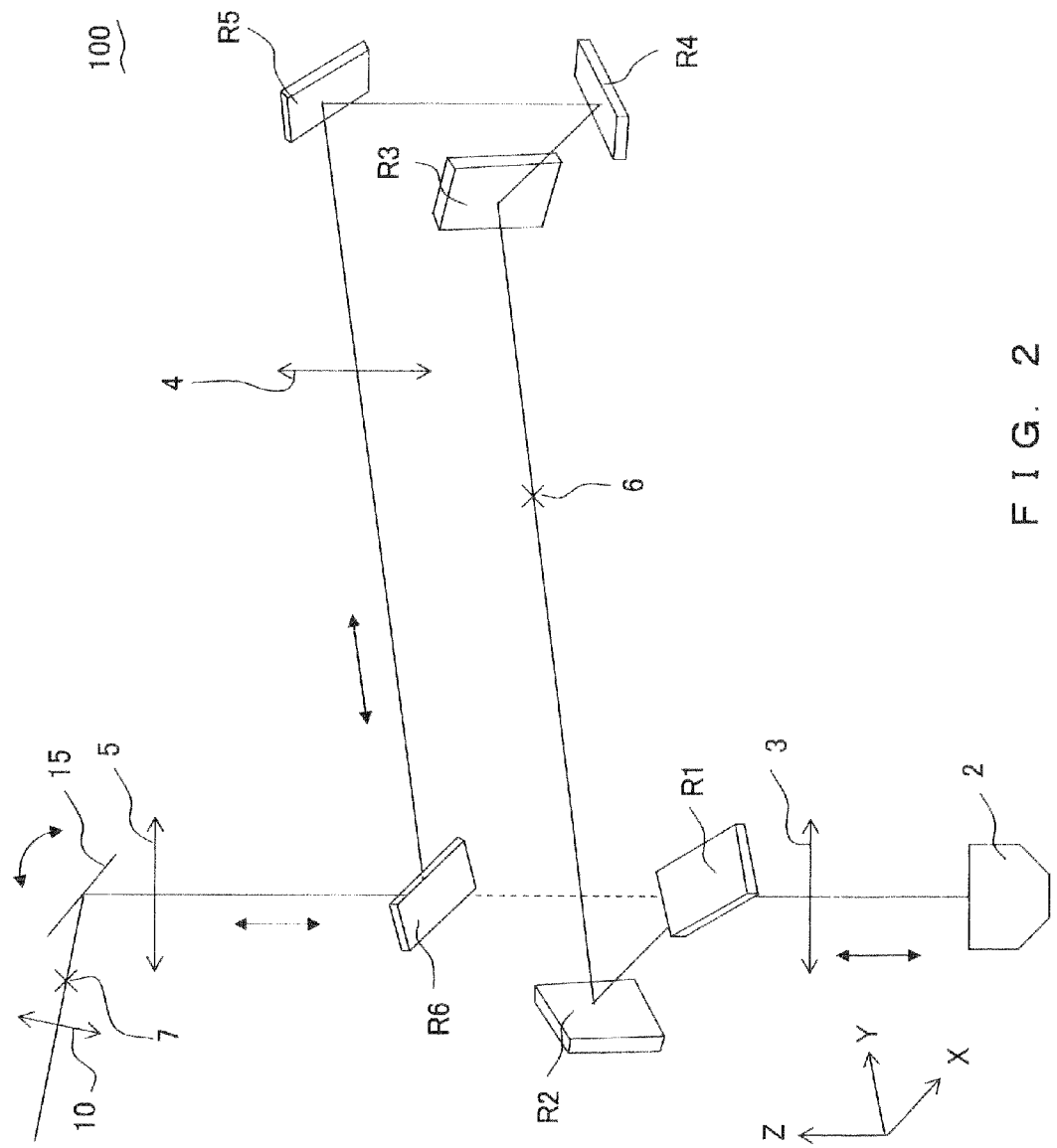
FIG. 2 is a schematic diagram three-dimensionally illustrating an optical path of the observation optical system illustrated in FIG. 1.

Embodiments according to the present invention are described below with reference to the drawings. A configuration and actions which are common to the embodiments are initially described.

FIG. 1 is a schematic diagram illustrating an optical configuration of an observation optical system according to an embodiment of the present invention. The observation optical system 100 is configured by including, in order from the side of a sample surface 1, an infinity-corrected objective 2, first lens group 3 having a positive power, a second lens group 4 having a positive power, and a tube lens 5 having a positive power.

A light ray emitted from the sample surface 1 is converted into an afocal light flux by the objective 2, and is incident to the first lens group 3. The first lens group 3 forms an intermediate image 6 by forming an image of the afocal light flux between the objective 2 and the first lens group 3. The second lens group 4 is arranged so that the intermediate image 6 and a front side focal position of the second lens group 4 match. Accordingly, the second lens group 4 acts to again convert an incident light flux into an afocal light flux. The tube lens 5 to which the afocal light flux is incident forms an image 7 by forming an image of the afocal light flux at a predetermined position. Then, the image 7 is observed by an observer through the eyepiece lens 10.

In the observation optical system 100, afocal parts at two points (namely, between the objective 2 and the first lens group 3, and between the second lens group 4 and the tube lens 5) are configured to be extensible/contractible in the path along an optical axis of the afocal light flux by an extensible/contractible mechanism not illustrated. Namely, a space along the optical axis between the objective 2 and the first lens group 3 is changeable, and also a space along the optical axis between the second lens group 4 and the tube lens 5 is changeable. Such an extension/contraction of the afocal parts can change the optical path length of the observation optical system without altering the position of the image 7 (more strictly, the position of the image 7 relative to the tube lens 5). Accordingly, if the observation optical system 100 having such a configuration is used in a microscope, an eye point position of the microscope can be adjusted by changing the optical path length with the extension/contraction of the afocal parts.

FIG. 2 three-dimensionally illustrates the optical path of the observation optical system 100 illustrated in FIG. 1. To configure the observation optical system 100 to be compact, it is effective to cause an optical path having a length needed for the observation optical system 100 to be as compact as possible. Accordingly, FIG. 2 illustrates an example of configuring a circular optical path by arranging a plurality of deflection surfaces, intended to deflect the direction of an optical axis, on the optical path reaching from the first lens group 3 to the tube lens 5. Specifically, first, second, third, fourth, fifth, and sixth reflection surfaces intended to deflect the optical axis are arranged on the optical axis in this order from the side of the sample surface 1. As a result, the entire observation optical system 100 is configured to be compact without increasing the size thereof in one direction. Here, FIG. 2 illustrates the example of configuring all the deflection surfaces as reflection surfaces. For example, a mirror, a prism or the like is available as a member that configures each reflection surface.

The observation optical path of the observation optical system 100 is further described in detail with reference to FIG. 2. In FIG. 2, an XYZ orthogonal coordinate system is defined as illustrated.

Initially, a light ray emitted from the first lens group 3 in a Z direction (+) is reflected one time on the reflection surface R1 in an X direction (−) in order to reduce the length of the observation optical system 100 in the Z direction. Next, the light reflected on the reflection surface R1 is respectively reflected on the reflection surfaces R2 and R3 in a Y direction (+) and the X direction (+) in order to prevent the observation optical path from extending too far in one direction on an XY plane. Here, the intermediate image 6 is formed between the reflection surfaces R2 and R3. Thereafter, the light ray that is incident to the reflection surface R4 and is reflected in the Z direction (+) is reflected on the reflection surface R5 in the Y direction (−), and is converted into an afocal light flux by the second lens group 4. The light ray converted into the afocal light flux further proceeds from the second lens group 4 in the Y direction (−), is reflected on the reflection surface R6 in the Z direction (+), and is incident to the tube lens 5.

As described above, the optical path from the reflection surface R1 to the reflection surface R6 is formed as a circular optical path composed of two stages in the X and the Y directions via the optical path reaching from the reflection surface R4 to the reflection surface R5 in the Z direction. As a result, it becomes possible to configure the observation optical system 100 where the length in the Z direction (for example, the height direction of the microscope) is reduced and the observation optical path does not extend too far in one direction on the XY plane. Consequently, the observation optical system 100 can be configured to be compact.

Additionally, the optical path illustrated in FIG. 2 is arranged preferably also for the intermediate image 6. Generally, if an intermediate image is formed in the vicinity of an optical element, dust or a flaw of the optical element is sometimes observed. Examples of ways to cope with such a problem include a method for arranging an optical element as far from an intermediate image as possible or a method for making dust less prone to settle on an optical element. In FIG. 2, the reflection surfaces (the reflection surfaces R2 and R3) before and after the intermediate image 6 are configured in parallel with the Z axis. Accordingly, if the Z dimension is for example a vertical dimension, then the reflection surfaces R2 and R3 will be vertical to a horizontal plane (the XY plane), and dust is less prone to settle on the reflection surfaces. In FIG. 2, the reflection surfaces are configured vertically to the horizontal plane (namely, in parallel with the vertical dimension). However, it is not always necessary to configure the reflection surfaces in parallel with the vertical dimension when dust is made to be less prone to settle on the optical element. Also, by configuring the reflection surfaces to tilt inward with respect to the horizontal plane, a similar effect can be achieved. Therefore, it is preferable to configure the reflection surfaces before and after the intermediate image 6 so as to form a right angle or an acute angle with respect to the horizontal plane. Namely, it is preferable to provide a normal to the reflection surfaces arranged before and after the intermediate image 6 that is nearly orthogonal to the optical axis of the objective 2.

Additionally, the reflection surfaces R1 to R6 that configure the optical path illustrated in FIG. 2 are also preferably configured from a microscope usability viewpoint. Since the intermediate image 6 is formed in the observation optical system 100, the intermediate image 6 is formed as an inverted image, and it is possible for an observed image to become an erected image. Generally, however, an image is observed as an inverted image in a microscope. Therefore, a relationship between the moving direction of a sample when an inverted image is observed and that of the image within a field of view is established in observers. Accordingly, an observer who is accustomed to this relationship does not easily become familiar with an erected image. Accordingly, it is preferable to further invert an image to be an inverted image for purposes of usability. In FIG. 2, the reflection surfaces R1 to R6 that configure the optical path configure an inversion optical system for rotating an image by 180 degrees. Accordingly, an observed image is inverted, leading to an improvement in usability. In FIG. 2, six reflection surfaces are provided. However, six reflection surfaces are not always needed to configure the inversion optical system. At least four reflection surfaces are needed to configure a porro inversion optical system referred to in this embodiment. Accordingly, it is preferable to configure the observation optical system 100 with at least four or more reflection surfaces.

The configuration of the observation optical path illustrated in FIG. 2 can be modified in various ways. FIG. 2 illustrates the example of arranging the optical axis of the light ray emitted from the first lens group 3 and that of the light ray incident to the tube lens 5 on the same axis. However, the configuration of the observation optical path is not particularly limited to this one. Alternatively, the optical axis of the light ray incident to the tube lens 5 may be configured to tilt in the Z direction. Moreover, FIG. 2 illustrates an example where the light rays before and after each of the reflection surfaces are orthogonal to each other. However, it is not always necessary to make the light rays orthogonal to each other. The observation optical system may be arbitrarily configured as long as a circular optical path is formed and the observation optical system is configured to be compact. Furthermore, the intermediate image 6 is formed between the reflection surfaces R2 and R3. However, the formation of the intermediate image 6 is not particularly limited to this one. The intermediate image 6 may be formed between the reflection surfaces R1 and R3. Alternatively, the intermediate image 6 may be formed between the reflection surfaces R1 and R5. Namely, the intermediate image 6 may be formed between the first lens group and the second lens group.

Influences exerted by the extension/contraction of the afocal parts are described next. In the observation optical system 100, the afocal parts are provided at two points. However, since the afocal parts extend/contract with fluctuations of a pupil position, the afocal parts cannot be extended/contracted unlimitedly. A relationship between the extension/contraction of the afocal parts and fluctuations of the pupil position, and an extension/contraction range of the afocal parts is described below with reference to FIGS. 3, 3B and 4.

Figure 3A:
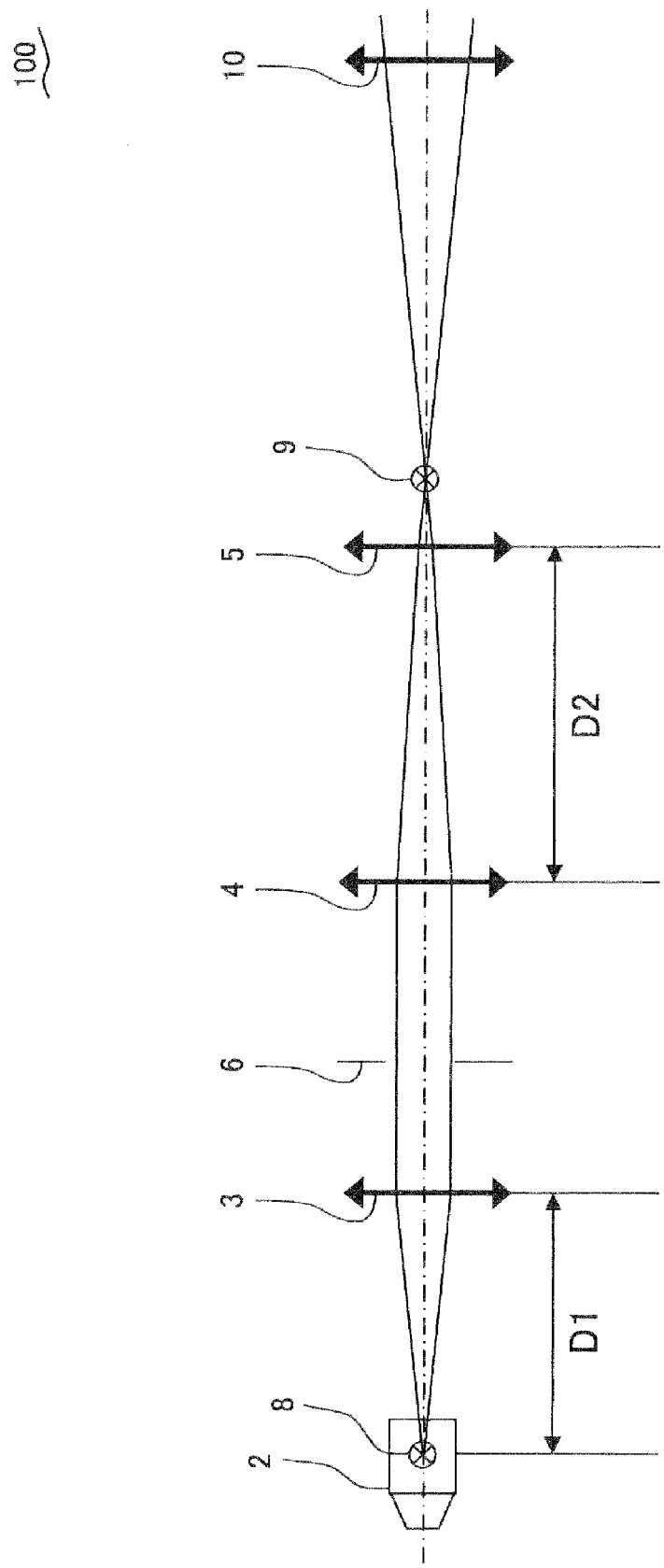
FIG. 3A is a schematic diagram for explaining a pupil position in a state where afocal parts of the observation optical system illustrated in FIG. 1 are contracted.
Figure 3B:
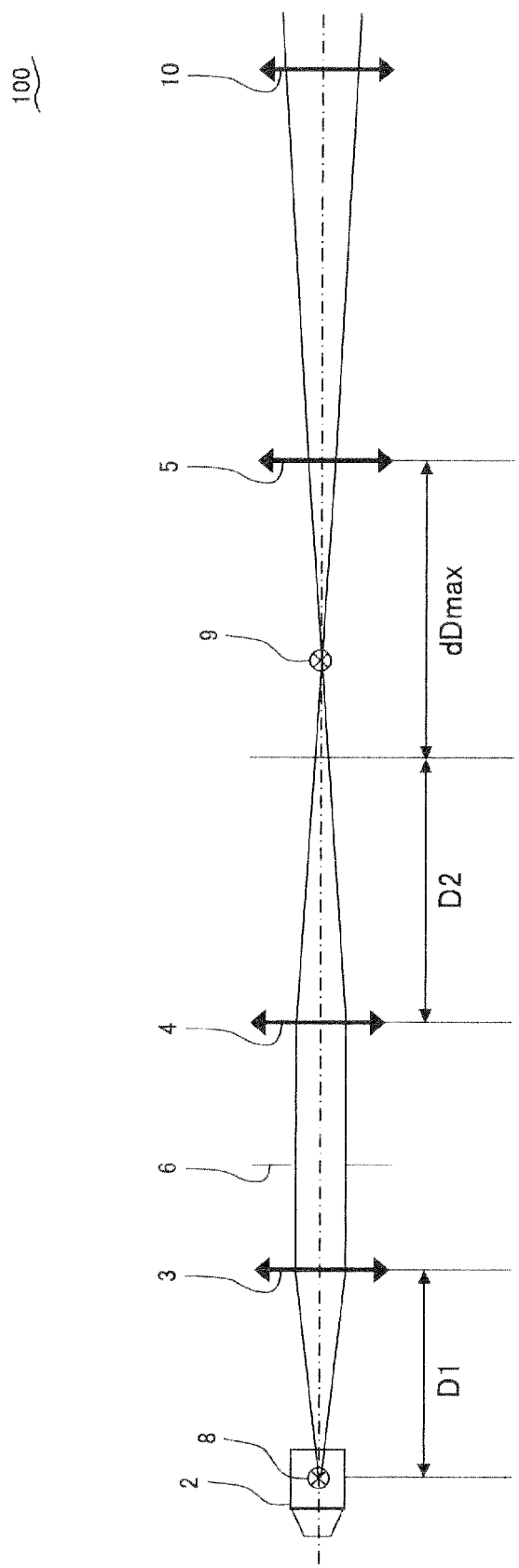
FIG. 3B is a schematic diagram for explaining the pupil position in a state where the afocal part of the observation optical system illustrated in FIG. 1 is extended.

FIGS. 3A and 3B are schematic diagrams for explaining the relationship between the pupil position of the observation optical system illustrated in FIG. 1 and the extension/contraction of the afocal parts. FIG. 3A illustrates a state where the afocal parts are contracted. Namely, FIG. 3A illustrates the state where the afocal part (hereinafter referred to as a first afocal part) between the pupil 8 of the objective 2 and the first lens group 3 is set to a minimum space D1, and the afocal part (hereinafter referred to as a second afocal part) between the second lens group 4 and the tube lens 5 is set to a minimum space D2. In the meantime, FIG. 3B illustrates a state where the afocal part is extended. Here, FIG. 3B illustrates the state where only the second afocal part contracted in the state of FIG. 3A is extended by an amount of change dDmax.

The second afocal part between the second lens group 4 and the tube lens 5 is provided between the reflection surfaces R4 and R6. FIG. 2 illustrates an example where the second afocal part is provided between the second lens group 4 and the reflection surface R6. In this case, the direction (Y direction) of the optical axis at the position of the intermediate image 6 and the direction (Y direction) of the optical axis at the second afocal part are nearly parallel, which is preferable.

Additionally, the second afocal part may be provided to straddle the reflection surface R6. Namely, the second afocal part may be provided not only between the second lens group 4 and the reflection surface R6 but between the tube lens 5 and the reflection surface R6. As a result, the second afocal part can change the space between the second lens group 4 and the reflection surface R6 and the space between the tube lens 5 and the reflection surface R6 to be in mutually different directions.

As illustrated in FIGS. 3A and 3B, the pupil 8 of the objective 2 is relayed by the first lens group 3 and the second lens group 4. As a result, an exit pupil 9 is positioned on the side of the eyepiece lens 10 with respect to the tube lens 5 in the state where the afocal parts are contracted as illustrated in FIG. 3A, or the exit pupil 9 is positioned on the side of the objective 2 with respect to the tube lens 5 in the state where the afocal part is extended as illustrated in FIG. 3B.

FIG. 3B illustrates the example where the optical path length is adjusted by extending only the second afocal part. However, the adjustment of the optical path length is not limited to this. It the optical path length is adjusted by extending the first afocal part, or it the optical path length is adjusted by extending the first afocal part and the second afocal part, the exit pupil 9 is positioned on the side of the objective 2 with respect to the tube lens 5. This acts in a similar manner as in the case of extending only the second afocal part.

As described above, the position of the exit pupil 9 significantly changes according to the extended/contracted state of the afocal parts in the range from the side of the objective 2 to the side of the eyepiece lens 10 with respect to the tube lens 5. Accordingly, depending on the position of the exit pupil 9, vignetting occurs before a principal ray that passes through the exit pupil 9 is incident to the eyepiece lens 10, and the principal ray cannot reach the eyepiece lens 10 in some cases. Namely, the extension/contraction range of the afocal parts is stipulated by the range in which the principal ray that passes through the exit pupil 9, the exit pupil 9 changes with the extension/contraction of the afocal parts, can be incident to the eyepiece lens 10 without being vignetted.

Figure 4:
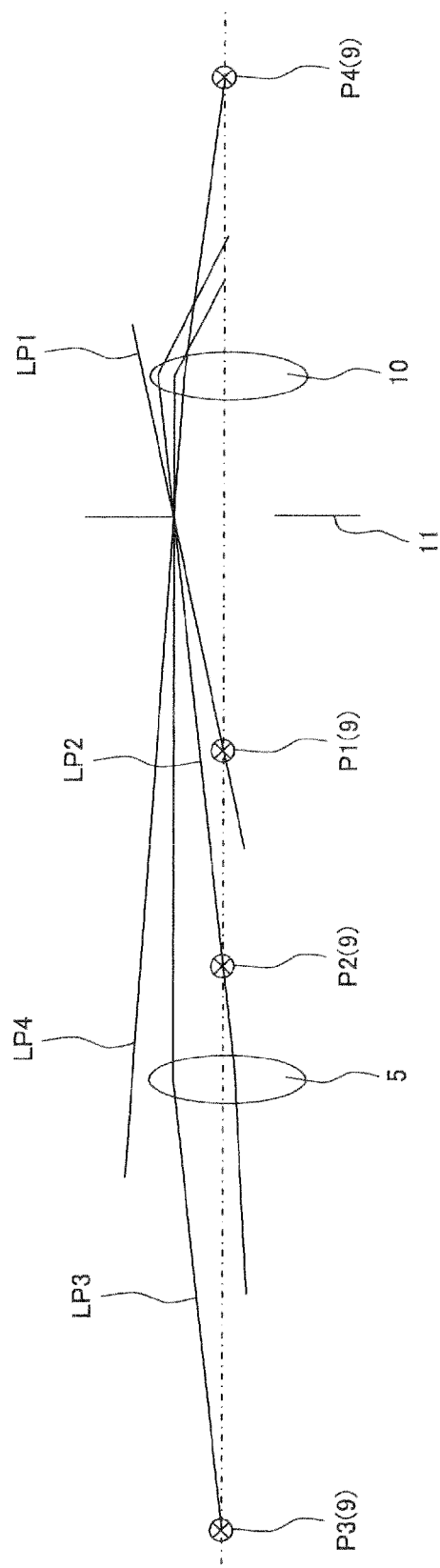
FIG. 4 is a schematic diagram for explaining a relationship between the pupil position of the observation optical system illustrated in FIG. 1 and an optical path of a principal ray that passes through an edge of a field stop.

FIG. 4 is a schematic diagram for explaining a relationship between the position of the pupil of the observation optical system illustrated in FIG. 1 and an optical path of a principal ray that passes through an edge of a field stop.

FIG. 4 illustrates the example of the exit pupil 9 at four positions P1 to P4, and optical paths of principal rays that pass through the exit pupil 9 existing at the respective positions and the edge of the field stop 11.

In FIG. 4, the position P4 is a position of the pupil 9 closest to the side of the eyepiece lens 10; more specifically, on a plus side (exit side) with respect to the eyepiece lens 10. However, the position P4 is the position of the pupil 9 closest to the side of the objective 2 (not illustrated) with respect to a minus side (incident side) of the eyepiece lens 10. Namely, this is the state where the exit pupil 9 fluctuates to the side of the objective 2 with respect to the tube lens 5 by a distance equal to or greater than a focal length f3 of the tube lens 5. The position 4 of the exit pupil 9 is a position in the state where the exit pupil 9 fluctuates beyond infinity on the side of the objective 2 and fluctuates to infinity on the side of the eyepiece lens 10 as a result of significantly fluctuating to the side of the objective 2, and further fluctuates to the position, illustrated in FIG. 4, on the plus side of the eyepiece lens 10.

A case where the exit pupil 9 exists at the position P2 on the side of the eyepiece lens 10 with respect to the tube lens 5 is initially described. In this case, a principal ray LP2 that passes through the edge of the field stop 11 at a relatively small angle is incident to an effective diameter of the eyepiece lens 10. Accordingly, the principal ray LP2 is not vignetted halfway.

A case where the exit pupil 9 exists at the position P1 closer to the side of the eyepiece lens 10 with respect to the position P2 is explained next. This corresponds to the case where the afocal parts are contracted from the state where the exit pupil 9 exists at the position P2. Since a distance from the position P1 to the field stop 11 is short in this case, a principal ray LP1 that passes through the edge of the field stop 11 proceeds from the edge of the field stop 11 to the eyepiece lens 10 at a large angle. Accordingly, the principal ray LP1 cannot be incident to the effective diameter of the eyepiece lens 10, and is vignetted by the eyepiece lens 10.

Inversely, a case where the exit pupil 9 exists at the position P3 closer to the side of the objective 2 with respect to the position P2 is described next. This corresponds to the case where the afocal part is extended from the state where the exit pupil 9 exists at the position P2. Since the position P3 is closer to the side of the objective 2 with respect to the tube lens 5 in this case, a principal ray LP3 from the position P3 passes through the edge of the field stop 11 in a state where an angle with respect to the optical axis is reduced by the tube lens 5 having a positive power. Accordingly, the principal ray LP3 can be incident to the effective diameter of the eyepiece lens 10 with a sufficient margin, and is not vignetted.

A case where the exit pupil 9 exists at the position P4 on the plus side of the eyepiece lens 10 as a result of fluctuating from the position P3 to the side of the objective 2 beyond the infinity of the objective 2 is further described. This corresponds to the case where the afocal part is further extended from the state where the exit pupil 9 exists at the position P3. In this case, a principal ray LP4 that passes through the edge of the field stop 11 is incident to the eyepiece lens 10 as focused light. Normally, an optical element on the optical path reaching up to the eyepiece lens 10 is set according to the state where the exit pupil 9 is positioned on the minus side of the eyepiece lens 10. Accordingly, if the exit pupil 9 exists on the plus side of the eyepiece lens 10, for example, at the position P4, the principal ray is vignetted on the optical path reaching up to the eyepiece lens 10.

As described above, if the afocal part is contracted too much as illustrated by the position P1 of the exit pupil 9, the principal ray that passes through the edge of the field stop forms a large angle with respect to the optical axis. Accordingly, the height of a ray when passing through the eyepiece lens 10 increases, and the ray is vignetted at the eyepiece lens 10.

In contrast, if the afocal part is extended too much as illustrated by the position P4 of the exit pupil 9, the position of the exit pupil 9 moves to the plus side with respect to the eyepiece lens 10. Accordingly, focused light is incident to the eyepiece lens 10, and the ray is vignetted before reaching the eyepiece lens 10.

In the meantime, if the afocal parts are extended/contracted in the range represented by the position P2 to the position P3 of the exit pupil 9, the principal ray passes through the edge of the field stop 11 at a relatively small angle with respect to the optical axis. Accordingly, the principal ray can be incident to the effective diameter of the eyepiece lens 10 without being vignetted. Namely, the state of the afocal parts, which corresponds to the range from the position P2 to the position P3, is the extension/contraction range of the afocal parts.

Influences exerted by a focal length f1 of the first lens group 3, a focal length f2 of the second lens group 4, and the focal length f3 of the tube lens 5 when a compact observation optical system 100 having a large extension/contraction range is implemented are described next.

To widen the extension/contraction range of the afocal parts by increasing the range from the position P2 to the position P3, it is especially effective to lengthen the focal length f3 of the tube lens 5. This is because the eyepiece lens 10 can capture more light from the exit pupil 9 that exists closer to the side of the objective 2 as the focal length f3 of the tube lens 5 increases.

In the meantime, it is preferable to shorten the focal length f1, the focal length f2, and the focal length f3 in order to configure the observation optical system 100 to be compact. In particular, it is preferable to configure the focal length f1 of the first lens group 3 to be short.

Figure 5A:
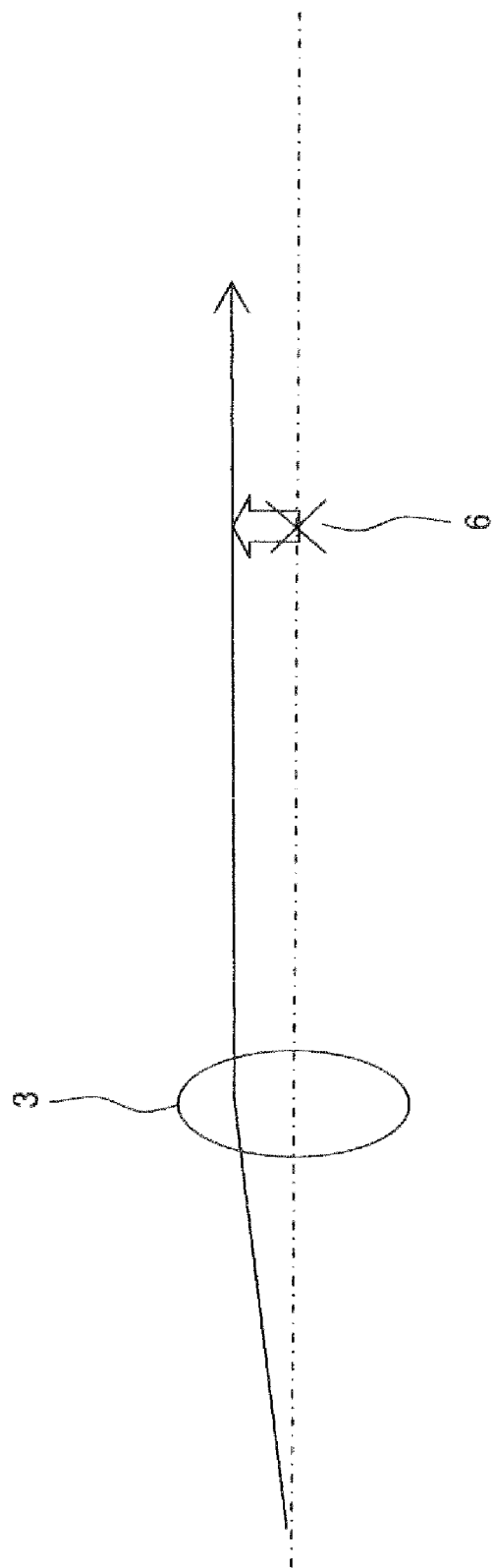
FIG. 5A is a schematic diagram for explaining an intermediate image formed when a focal length of a first lens group is short.
Figure 5B:
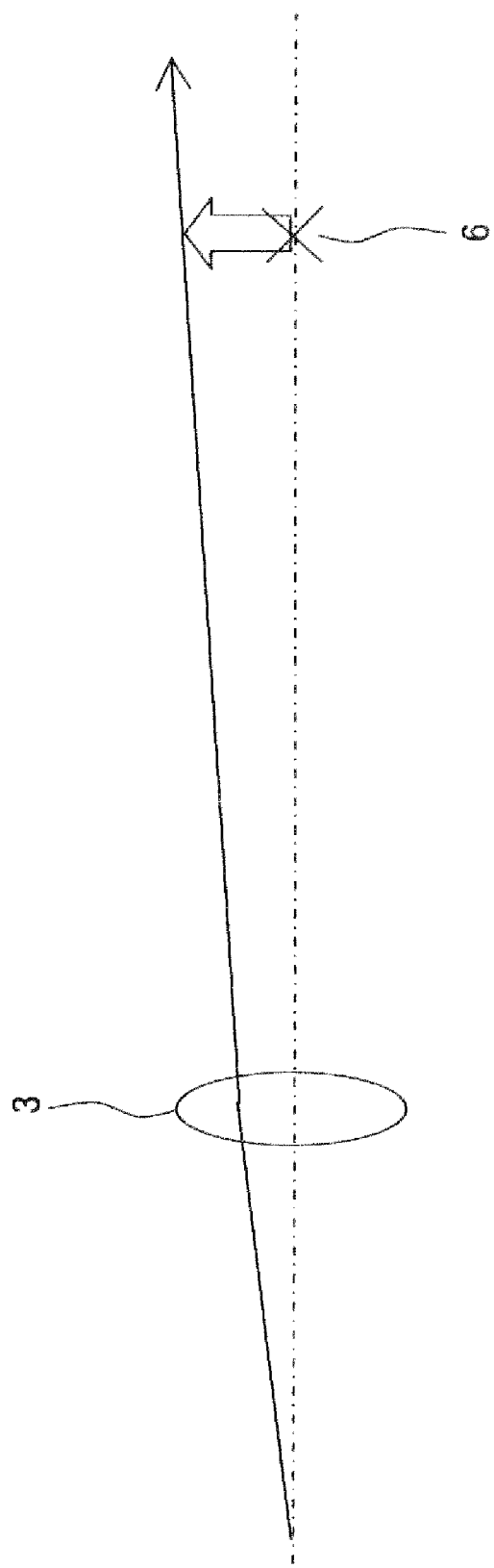
FIG. 5B is a schematic diagram for explaining the intermediate image formed when the focal length of the first lens group is long.

FIGS. 5A and 5B are schematic diagrams for explaining a relationship between the focal length of the first lens group and an intermediate image. FIG. 5A illustrates a case where the focal length f1 of the first lens group 3 is relatively short. In this case, the power of the first lens group 3 is high, and a magnification of the intermediate image 6 is relatively small. Therefore, the height of a ray after the first lens group 3 decreases. In the meantime, FIG. 5B illustrates a case where the focal length f1 of the first lens group 3 is relatively long. In this case, the power of the first lens group 3 is low, and the magnification of the intermediate image 6 becomes relatively large. Therefore, the height of the ray after the first lens group 3 increases.

As described above, if the focal length f1 is short, the height of a ray between the first lens group 3 and the second lens group 4 can be reduced. The height of the ray between the first lens group 3 and the second lens group 4 exerts an influence on the distance between the reflection surfaces R4 and R5 in FIG. 2. Most of the distance between the reflection surfaces R4 and R5, namely, most of the distance needed between the optical axes of the two-stage structure of the round optical path, is occupied by the height of the ray. Accordingly, the height of the ray is reduced by shortening the focal length f1, whereby the observation optical system 100 can be configured to be more compact. Specifically, it is preferable that the focal length f1 be equal to or smaller than 1.5 times the minimum space D1 between the pupil 8 of the objective 2 and the first lens group 3. However, if the focal length f1 is configured to be extremely short, the optical path length between the first lens group 3 and the second lens group 4 becomes short, and the reflection surfaces before and after the intermediate image 6 become too close to the intermediate image 6, which is not preferable. Specifically, it is preferable to set the distance of the optical path from the intermediate image 6 to the reflection surfaces before and after the intermediate image 6 to at least 5 times f1/EA or greater if the effective diameter of the first lens group 3 on the side of the objective 2 is assumed to be EA.

The first lens group 3 and the second lens group 4 interposed between the objective 2 and the tube lens 5 may be configured as an intermediate lens barrel. In this case, since the magnification of the intermediate lens barrel is defined to be approximately 1×, it is preferable to set the focal length f2 to a length that is not significantly different from the focal length f1.

Therefore, it is preferable to configure the observation optical system 100 so that the focal lengths f3 and f1 are respectively long and short. Specifically, it is preferable to configure the observation optical system 100 so that the following conditional expression (1) is satisfied.

$$0.45 < f1/f3 < 0.80 \quad (1)$$

Additionally, it is further preferable to configure the observation optical system 100 so that the focal length f2 is set to a length that is not significantly different from the focal length f1 if the first lens group 3 and the second lens group 4 are implemented as an intermediate lens barrel. Specifically, it is preferable to configure the observation optical system 100 so that the following conditional expression (2) is satisfied.

$$0.95 < f1/f2 < 1.05 \quad (2)$$

Based on the above conditions, it is preferable to configure the observation optical system 100 so that the following conditional expression (3) is satisfied.

$$0 < dD/f3 < 1.4 \quad (3)$$

where dD is a total amount of change of the extension of the afocal parts, and is the sum of the amount of change dD1 of the first afocal part and the amount of change dD2 of the second afocal part.

The conditional expression (1) is an expression that stipulates a balance between the focal length f1 of the first lens group 3 and the focal length f3 of the tube lens 5. By satisfying the conditional expression (1), a compact observation optical system 100 where the maximum amount of change in the afocal part is large can be implemented. If the conditional expression (1) exceeds an upper limit value (0.80), the focal length f3 becomes short. Therefore, an extensible amount of the afocal part cannot, be sufficiently secured. Moreover, since the focal length f1 becomes long, not only the magnification of the intermediate image but the height of a ray increases. This makes it difficult to configure the observation optical system 100 to be compact. Moreover, the focal length f1 becomes closer to the focal length f3, and the total length of the optical path of the observation optical system 100 increases, leading to difficulty in configuring a compact observation optical system 100. In contrast, if the conditional expression (1) falls below a lower limit value (0.45), the focal length f1 becomes too short, and, so does the length of the optical path between the first lens group 3 and the second lens group 4. This makes it difficult to configure a reflection surface. Even if a reflection surface is configured, the intermediate image 6 becomes too close to reflection surfaces before and after the intermediate image 6. Therefore, a flaw or dust on the reflection surface becomes conspicuous.

The conditional expression (2) is an expression that stipulates a balance between the focal length f1 of the first lens group 3 and the focal length f2 of the second lens group 4. If the first lens group 3 and the second lens group 4 are configured as an intermediate lens barrel, it is preferable to set the magnification of the intermediate lens barrel to approximately 1×. Therefore, the conditional expression (2) represents a condition wherein the magnification of the intermediate lens barrel is within a range of plus or minus 5 percent of 1×. In contrast, if the magnification of the intermediate lens barrel goes beyond this range, the focal length of the tube lens 5 needs to be set to a length different from the focal length as a reference for the microscope. This leads to a design complexity in the optical system.

The conditional expression (3) is an expression that stipulates the length of the focal length f3 of the tube lens 5 with respect to the total amount of change dD of the afocal parts. The maximum amount of change of the afocal part significantly depends on the focal length f3, and its limit is approximately 1.4 times the focal length f3. Accordingly, by reducing the total amount of change dD of the afocal parts to 1.4 times the focal length f3 of the tube lens based on the premise that the conditional expression (1) is satisfied, vignetting caused by the extension (or contraction) of the afocal part can be further prevented from occurring. Specifically, if the total amount of change dD is more than 1.4 times the focal length f3, the exit pupil 9 becomes too close to the eyepiece lens 10 when the afocal parts are contracted, and vignetting occurs at the eyepiece lens 10. Alternatively, the exit pupil 9 becomes too far from the minus side of the eyepiece lens 10 when the afocal part is extended, and the exit pupil 9 moves to the plus side of the eyepiece lens 10 beyond infinity. As a result, vignetting occurs on the optical path before the principal ray reaches the eyepiece lens 10.

Figure 6:
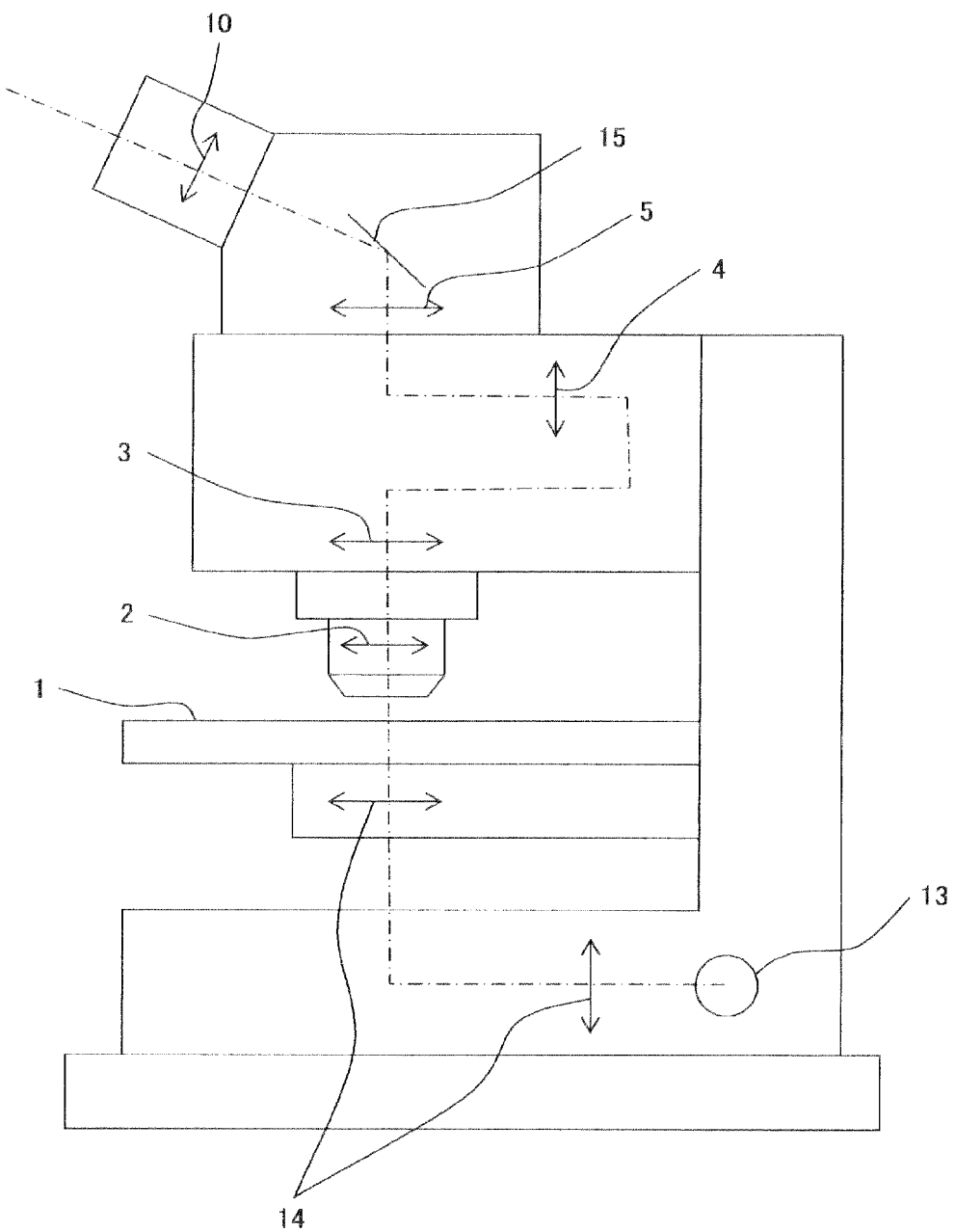
FIG. 6 is a conceptual schematic illustrating configuration of a microscope according to an embodiment of the present invention.

FIG. 6 is a conceptual schematic illustrating a configuration of a microscope according to an embodiment of the present invention. The microscope 200 is configured by including a light source 13, an illumination optical system 14, an objective 2, a first lens group 3, a second lens group 4, a tube lens 5, an eyepiece lens 10, and a turning mechanism 15. The objective 2, the first lens group 3, the second lens group 4, the tube lens 5, and the eyepiece lens 10 configure the above described observation optical system 100.

In the microscope 200, the optical path length can be changed by extending/contracting a first afocal part between the objective 2 and the first lens group 3. As a result, the position of an eye point in the vertical dimension can be adjusted. Moreover, the length of the optical path can be changed by extending/contracting a second afocal part between the second lens group 4 and the tube lens 5 in the microscope 200. Since an extensible amount of the observation optical system 100 is large in the microscope 200, it is possible to divide the extensible amount of the second afocal part in two directions by arranging a reflection surface. This enables the eye point position in the vertical and the horizontal dimensions to be adjusted by extending/contracting the second a focal part. Moreover, the turning mechanism 15 for changing an angle formed by the optical axis of the tube lens 5 and the optical axis of the eyepiece lens 10 is provided between the tube lens 5 and the eyepiece lens 10, whereby an angle of depression (namely, the angle of the optical axis at the eye point position) can be adjusted.

As described above, the microscope 200 includes the compact observation optical system 100 having a large extensible amount, thereby enabling the eye point position to be sufficiently adjusted. As a result, the eye point position according to the body of an observer can be implemented.

The configuration and actions which are common to the embodiments have been described up to this point. The respective embodiments according to the present invention are specifically described next.

<First Embodiment>

Figure 7A:
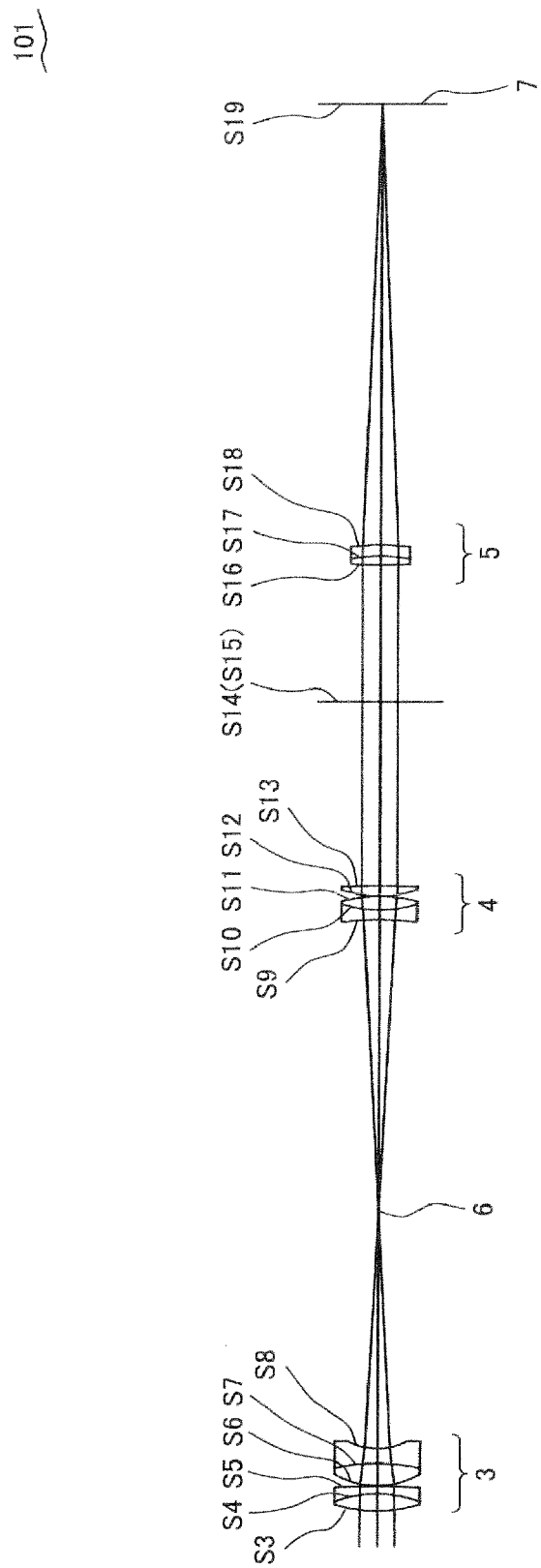
FIG. 7A is a schematic diagram illustrating an optical configuration when afocal parts of an observation optical system according to a first embodiment of the present invention are contracted.
Figure 7B:
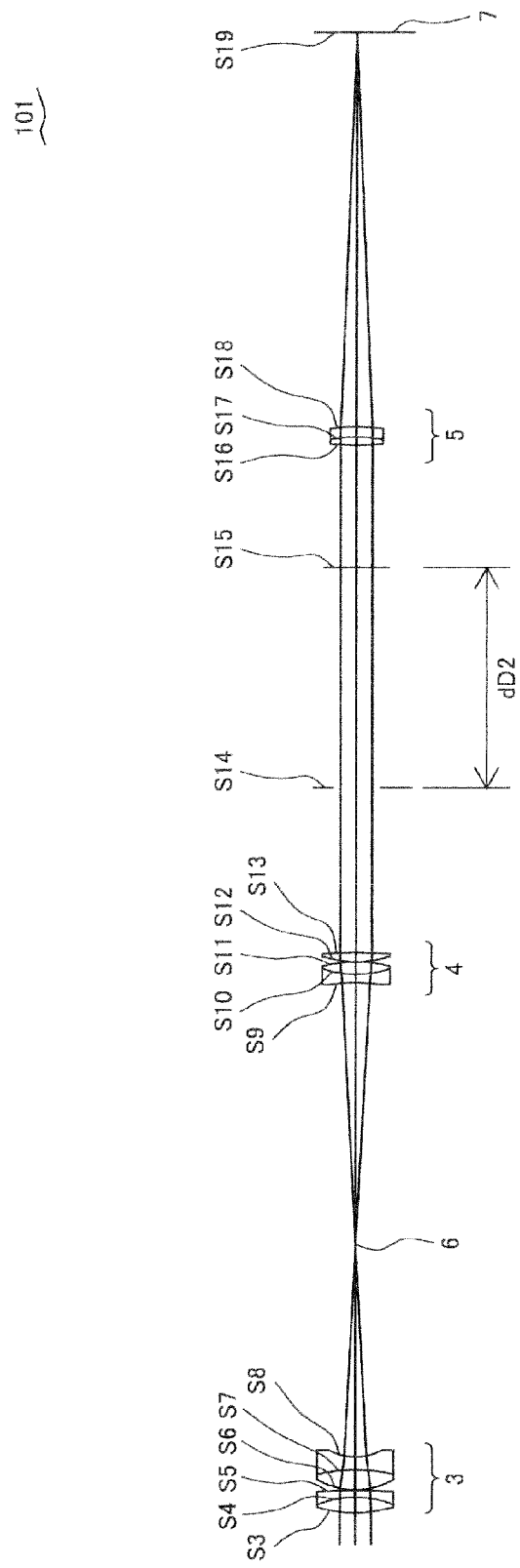
FIG. 7B is a schematic diagram illustrating an optical configuration when the afocal part of the observation optical system according to the first embodiment of the present invention is extended.

FIGS. 7A and 7B illustrate a configuration of an observation optical system according to a first embodiment. FIG. 7A illustrates a state where afocal parts are contracted, whereas FIG. 7B illustrates a state where the afocal part is extended.

The observation optical system 101 according to this embodiment is configured by including, in order from a sample side, an objective 2 not illustrated, a first lens group 3 composed of four lenses, a second lens group 4 composed of three lenses, and a tube lens 5 composed of two lenses. An intermediate image 6 is formed between the first lens group 3 and the second lens group 4, and an image 7 is formed in the rear of the tube lens 5.

Focal lengths of the first lens group 3, the second lens group 4, and the tube lens 5 are f1=134.05 (mm), f2=134.03 (mm), and f3=180 (mm), respectively. Lens data of the observation optical system 101 is as follows. Here, s, r, d, nd, and vd represent a surface number, a radius of curvature (mm), a lens space or thickness (mm), a refractive index of a d line, and an Abbe's number of the d line, respectively.

| observation optical system 101 | | | | |
|---|---|---|---|---|
| s | r | d | nd | vd |
| S1 | INF | 95 | | |
| S2 | INF | dD1 | 1.0 | |
| S3 | 57.809 | 7.000 | 1.48749 | 70.23 |
| S4 | −46.779 | 3.200 | 1.72047 | 34.71 |
| S5 | −244.589 | 0.200 | 1.0 | |
| S6 | 33.276 | 9.000 | 1.74950 | 35.28 |
| S7 | −80.319 | 6.000 | 1.72047 | 34.71 |
| S8 | 24.677 | 214.945 | 1.0 | |
| S9 | −110.190 | 4.000 | 1.75500 | 52.32 |
| S10 | 47.091 | 5.500 | 1.48749 | 70.23 |
| S11 | −62.062 | 0.200 | 1.0 | |
| S12 | 50.967 | 4.000 | 1.48749 | 70.23 |
| S13 | −325.363 | 75.000 | 1.0 | |
| S14 | INF | dD2 | 1.0 | |
| S15 | INF | 55.500 | 1.0 | |
| S16 | 174.217 | 3.630 | 1.48749 | 70.23 |
| S17 | −65.165 | 4.580 | 1.74950 | 35.28 |
| S18 | −110.616 | 179.316 | | |

Here, the lens space or thickness of the surface number S1 represents a space or thickness between the surface numbers S1 and S2. The surface number S1 represents the position of the pupil 8 of the objective 2 not illustrated. Moreover, the space or thickness of the lens of the surface number S1 represents a minimum space of the first afocal part, and the space or thickness of the lens of the surface number S2 represents an amount of change dD1 for the minimum space of the first afocal part. The space or thickness of the lens of the surface number S14 represents an amount of change dD2 for the minimum space of the second afocal part.

The observation optical system 101 according to this embodiment satisfies conditional expressions (1) and (2) as represented by the following expressions (C1) and (C2). Expressions (C1) and (C2) respectively correspond to conditional expressions (1) and (2).

$$f1/f3 = 134.05/180 \approx 0.74 \quad (C1)$$

$$f1/f2 = 134.05/134.03 \approx 1.00 \quad (C2)$$

Additionally, in this embodiment, the amount of change dD1 for the minimum space of the first afocal part is 0 mm or more and 115 mm or less, and the amount of change dD1 is 115 mm at the maximum. Similarly, the amount of change dD2 for the minimum space of the second afocal part is 0 mm or more and 105 mm or less, and the amount of change dD2 is 105 mm at the maximum. Accordingly, the conditional expression (3) (namely, the total amount of change dD<252=180×1.4) is satisfied even if both the first and the second afocal parts are changed the maximum amounts. The amount of change dD1 and the amount of change dD2 are also influenced by a relationship between a lens diameter and the diameter of a light flux. To reduce the size of the observation optical system and the microscope, it is preferable for the lens diameter to be small. Accordingly, the effective diameter of the lens is set to 1.5 times maximum image height or less in this embodiment.

As described above, the observation optical system 101 according to this embodiment has a compact configuration, and can secure a large amount of extension/contraction ability (namely, the amount of change) in the afocal parts. Accordingly, with the observation optical system 101, a microscope having a large amount of adjustment ability in the eye point position can be provided.

<Second Embodiment>

Figure 8A:
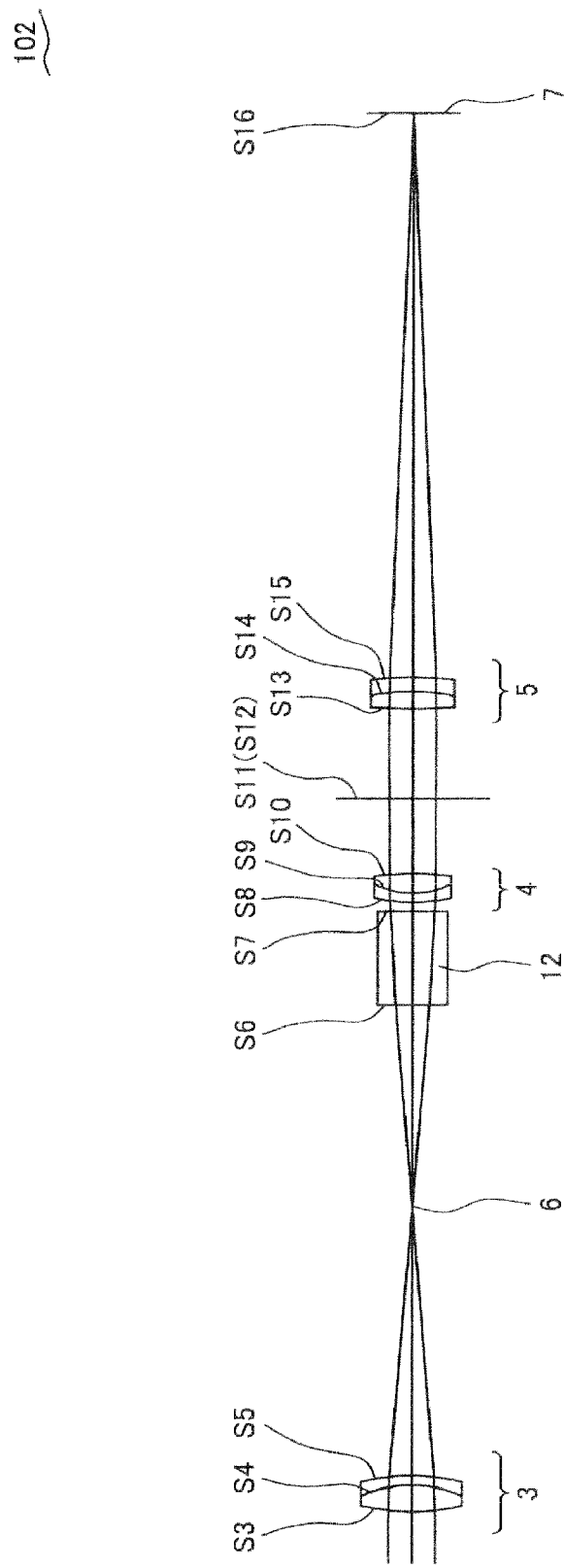
FIG. 8A is a schematic diagram illustrating an optical configuration when afocal parts of an observation optical system according to a second embodiment of the present invention are contracted.
Figure 8B:
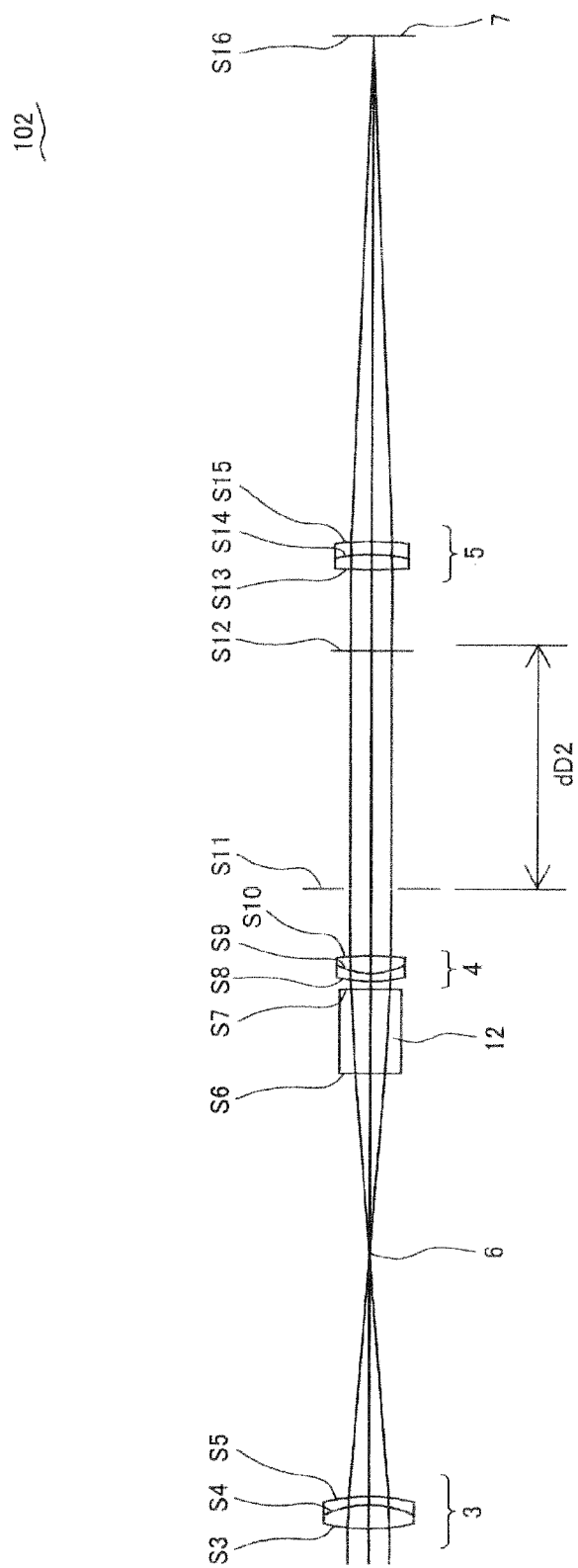
FIG. 8B is a schematic diagram illustrating an optical configuration when the afocal part of the observation optical system according to the second embodiment of the present invention is extended.

FIGS. 8A and 8B illustrate a configuration of an observation optical system according to this embodiment. FIG. 8A illustrates a state where afocal parts are contracted, whereas FIG. 8B illustrates a state where the afocal part is extended.

An observation optical system 102 according to this embodiment is configured by including, in order from a sample side, an objective 2 not illustrated, a first lens group 3 composed of two lenses, a prism 12, a second lens group 4 composed of two lenses, and a tube lens 5 composed of two lenses. An intermediate image 6 is formed between the first lens group 3 and the second lens group 4, and an image 7 is formed at the rear of the tube lens 5.

Focal lengths of the first lens group 3, the second lens group 4, and the tube lens 5 are f1=89.97 (mm), f2=90 (mm), and f3=180.17 (mm), respectively. Lens data of the observation optical system 102 is as follows. Here, s, r, d, nd, and vd represent a surface number, a radius of curvature (mm), a lens space or thickness (min), a refractive index of a d line, and an Abbe's number of the d line, respectively.

| observation optical system 102 | | | | |
|---|---|---|---|---|
| s | r | d | nd | vd |
| S1 | INF | 95 | | |
| S2 | INF | dD1 | 1.0 | |
| S3 | 67.434 | 8.500 | 1.48749 | 70.23 |
| S4 | −36.268 | 0.052 | 1.0 | |
| S5 | −35.806 | 3.000 | 1.73800 | 32.26 |
| S6 | −65.776 | 151.103 | 1.0 | |
| S7 | INF | 30.000 | 1.51633 | 64.14 |
| S8 | INF | 2.943 | 1.0 | |
| S9 | 52.903 | 2.800 | 1.61340 | 44.27 |
| S10 | 24.635 | 6.300 | 1.48749 | 70.23 |
| S11 | −102.570 | 24.000 | 1.0 | |
| S12 | INF | dD2 | 1.0 | |
| S13 | INF | 29.000 | 1.0 | |
| S14 | 193.123 | 5.500 | 1.48749 | 70.23 |
| S15 | −61.238 | 4.600 | 1.72047 | 34.71 |
| S16 | −105.391 | 181.114 | | |

Here, the lens space or thickness of the surface number S1 represents the space or thickness between the surface numbers S1 and S2. The surface number S1 represents the position of the pupil 8 of the objective 2 not illustrated. Moreover, the space or thickness of the lens of the surface number S1 represents a minimum space of the first afocal part, and the space or thickness of the lens of the surface number S2 represents an amount of change dD1 for the minimum space of the first afocal part. The space or thickness of the lens of the surface number S12 represents an amount of change dD2 for the minimum space of the second afocal part.

The observation optical system 102 according to this embodiment satisfies the conditional expressions (1) and (2) as represented by the following expressions (C11) and (C12). The expressions (C11) and (C12) respectively correspond to the conditional expressions (1) and (2).

$$f1/f3=89.97/180.17\approx0.50 \quad \quad (C11)$$

$$f1/f2=89.97/90\approx1.00 \quad \quad (C12)$$

Additionally, the amount of change dD1 for the minimum space of the first afocal part is 0 mm or more and 90 mm or less, and the amount of change dD1 is 90 mm at the maximum. Similarly, the amount of change dD2 for the minimum space of the second afocal part is 0 mm or more and 85 mm or less, and the amount of change dD2 is 85 mm at the maximum. Accordingly, the conditional expression (3) (namely, the total amount of change dD<252.23=180.17×1.4) is satisfied even if both the first and the second afocal parts are changed at the maximum. The amount of change dD1 and the amount of change dD2 are also influenced by a relationship between a lens diameter and the diameter of a light flux. To reduce the size of the observation optical system and the microscope, it is preferable for the lens diameter to be small. Accordingly, the effective diameter of the lens is set to 1.5 times a maximum image height or less in this embodiment.

In this embodiment, the focal lengths of the first lens group 3 and the second lens group 4 are configured to be shorter than those of the first embodiment. Accordingly, the observation optical system 102 can be configured to be more compact than the first embodiment. On the other hand, reflection surfaces (not illustrated) before and after the intermediate image 6 become close to the intermediate image 6. Therefore, dust or a flaw of the reflection surfaces becomes conspicuous. Accordingly, the prism is arranged between the first lens group 3 and the second lens group 4 to secure the optical path length between the first lens group 3 and the second lens group 4 in the observation optical system 102.

As described above, the observation optical system 102 according to this embodiment has a compact configuration, and can secure a large amount of extension/contraction ability (namely, the amount of change) in the afocal parts. Accordingly, with the observation optical system 102, a microscope having a large amount of adjustment ability in the eye point position can be provided.

What is claimed is:

1. An observation optical system comprising, in order from a sample side:
   an infinity-corrected objective;
   a first lens group having a positive power;
   a second lens group having a positive power; and
   a tube lens having a positive power,
   wherein an intermediate image is formed between the first lens group and the second lens group, at a front side focal position of the second lens group,
   wherein a first space along an optical axis between the objective and the first lens group is configured to be changeable,
   wherein a second space along the optical axis between the second lens group and the tube lens is configured to be changeable, and
   wherein if f1 and f3 are respectively defined to be a focal length of the first lens group and a focal length of the tube lens, a following condition is satisfied: $0.45<f1/f3<0.80$.

2. The observation optical system according to claim 1, wherein if an amount of change from a minimum space of the first space between the objective and the first lens group is defined to be dD1, an amount of change from a minimum space of the second space between the second lens group and the tube lens is defined to be dD2, and a sum of the amount of change dD1 and the amount of change dD2 is defined to be a total amount of change dD, a following condition is satisfied: $0<dD/f3<1.45$.

3. The observation optical system according to claim 1, further comprising four or more reflection surfaces on the optical axis,
   wherein a normal to reflection surfaces arranged before and after the intermediate image is arranged to be nearly orthogonal to the optical axis of the objective.

4. The observation optical system according to claim 1, further comprising four or more reflection surfaces on the optical axis,
   wherein the four or more reflection surfaces configure an inversion optical system for inverting an image.

5. The observation optical system according to claim 1, further comprising, in order from the sample side and on the optical axis, a first reflection surface, a second reflection surface, a third reflection surface, a fourth reflection surface, a fifth reflection surface, and a sixth reflection surface, each of which is intended to deflect the optical axis.

6. The observation optical system according to claim 5, wherein a position of the intermediate image is between the first reflection surface and the third reflection surface, and
   wherein a portion of the second space that is changeable is sandwiched between the fourth reflection surface and the sixth reflection surface.

7. The observation optical system according to claim 6, wherein a first direction along the optical axis at the position of the intermediate image and a second direction along the optical axis at the portion of the second space that is changeable are nearly parallel to each other.

8. The observation optical system according to claim 7, wherein the first reflection surface, the second reflection surface, the third reflection surface, the fourth reflection surface, the fifth reflection surface, and the sixth reflection surface respectively deflect the optical axis in nearly orthogonal directions.

9. The observation optical system according to claim 5, wherein a position of the intermediate image is between the first reflection surface and the fifth reflection surface.

10. The observation optical system according to claim 5, wherein a position of the intermediate image is between the second reflection surface and the third reflection surface.

11. The observation optical system according to claim 5, wherein the sixth reflection surface is arranged between the second lens group and the tube lens, and
    wherein a third space between the second lens group and the sixth reflection surface, and a fourth space between the sixth reflection surface and the tube lens are changeable in mutually different directions.

12. A microscope comprising the observation optical system according to claim 1.

13. The microscope according to claim 12, wherein the observation optical system further includes an eyepiece lens, and
    wherein the microscope further comprises a turning mechanism for changing an angle formed between the optical axis of the tube lens and the optical axis of the eyepiece lens.

14. An observation optical system comprising, in order from a sample side:

an infinity-corrected objective;
a first lens group having a positive power;
a second lens group having a positive power; and
a tube lens having a positive power,
wherein an intermediate image is formed between the first lens group and the second lens group, at a front side focal position of the second lens group,
wherein a first space along an optical axis between the objective and the first lens group is configured to be changeable,
wherein a second space along the optical axis between the second lens group and the tube lens is configured to be changeable, and
wherein if f1 and f2 are respectively defined to be a focal length of the first lens group and a focal length of the second lens group, a following condition is satisfied:

$0.95 < f1/f2 < 1.05$.

15. The observation optical system according to claim 14, further comprising four or more reflection surfaces on the optical axis,
wherein a normal to reflection surfaces arranged before and after the intermediate image is arranged to be nearly orthogonal to the optical axis of the objective.

16. The observation optical system according to claim 14, further comprising four or more reflection surfaces on the optical axis,
wherein the four or more reflection surfaces configure an inversion optical system for inverting an image.

17. The observation optical system according to claim 14, further comprising, in order from the sample side and on the optical axis, a first reflection surface, a second reflection surface, a third reflection surface, a fourth reflection surface, a fifth reflection surface, and a sixth reflection surface, each of which is intended to deflect the optical axis.

18. The observation optical system according to claim 17, wherein a position of the intermediate image is between the first reflection surface and the third reflection surface, and
wherein a portion of the second space that is changeable is between the fourth reflection surface and the sixth reflection surface.

19. The observation optical system according to claim 18, wherein a first direction along the optical axis at the position of the intermediate image and a second direction along the optical axis at the portion of the second space that is changeable, are nearly parallel to each other.

20. The observation optical stem according to claim 19, wherein the first reflection surface, the second reflection surface, the third reflection surface, the fourth reflection surface, the fifth reflection surface, and the sixth reflection surface respectively deflect the optical axis in nearly orthogonal directions.

21. The observation optical system according to claim 17, wherein a position of the intermediate image is between the first reflection surface and the fifth reflection surface.

22. The observation optical system according to claim 17, wherein a position of the intermediate image is between the second reflection surface and the third reflection surface.

23. The observation optical system according to claim 17, wherein the sixth reflection surface is arranged between the second lens group and the tube lens, and
wherein a third space between the second lens group and the sixth reflection surface, and a fourth space between the sixth reflection surface and the tube lens are changeable in mutually different directions.

24. A microscope comprising the observation optical system according to claim 14.

25. The microscope according to claim 24, wherein the observation optical system includes an eyepiece lens, and
wherein the microscope further comprises a turning mechanism for changing an angle formed between the optical axis of the tube lens and the optical axis of the eyepiece lens.

* * * * *